Patented Oct. 31, 1944

2,361,543

UNITED STATES PATENT OFFICE 2,361,543

TREATMENT OF RUBBER

Edwin J. Hart, Cedar Grove, N. J., and Robert T. Armstrong, New York, N. Y., assignors to United States Rubber Company, New York, N. Y., a corporation of New Jersey No Drawing. Application November 6, 1941, Serial No. 418,042

17 Claims. (Cl. 260—808)

This invention relates to the treatment of rubber and similar oxidizable materials and more particularly to a new class of deterioration retarders.

This application is a continuation-in-part of our application Serial No. 332,780, filed May 1, 1940.

An object of this invention is to provide a new class of anti-oxidants or age resisters for organic substances which tend to deteriorate by absorption of oxygen from the air, for example goods of rubber or allied gums, unsaturated fatty oils, petroleum oils such as gasolines, soaps, aldehydes, synthetic resins, turpentine and the like. A further object is to provide chemicals which show little or no discoloration of the surface of a rubber composition containing them, on exposure to sunlight. Further objects will be apparent from the following description.

Broadly, the invention comprises the incorporation in rubber and the like as aforesaid, of a member of the class consisting of compounds represented by the formula:

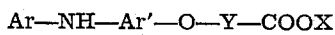

where Ar and Ar' are aromatic groups; Y represents a hydrocarbon radical; X is a member of the group consisting of hydrogen and base-forming radicals. By "base-forming radicals" is meant an element normally forming salts with acids, such as zinc, calcium, magnesium, sodium, ammonium, dimethyl ammonium and the like. Among such compounds are the arylamino aryloxy aliphatic acids, arylamino aryloxy aromatic acids, arylamino aryloxy arylalkyl carboxylic acids, and the metal, ammonium, and alkyl ammonium salts thereof. The acids may contain one or more carboxylic acid groups, where used alone, or for preparation of the salts which are to be used. By aryl group is means an aromatic hydrocarbon radical, further substituted or not as by alkyl or hydroxy groups, and having a free valence belonging to the aromatic nucleus.

The useful chemicals are further illustrated by the following examples:

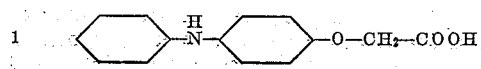

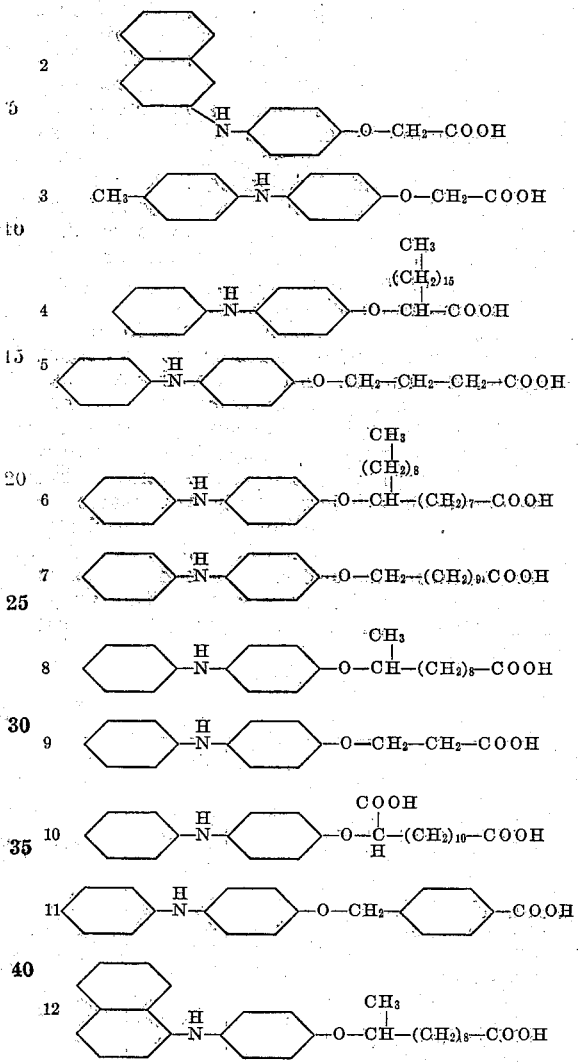

The chemicals may be prepared by well-known methods, such as, for example, by the interaction of a hydroxy-diarylamine and a halogen substituted organic acid in the presence of alkali. The zinc salts may be made by mixing a water solution of an equivalent amount of the sodium salt of the chemical with a water solution of zinc sulfate. The zinc salt precipitates.

The chemicals may be used in the pure state or as crude products of reaction. The following table lists some of the physical properties of some of the pure chemicals:

|  | Melting point | Neutralization equivalent | | Nitrogen analysis | |
|---|---|---|---|---|---|
|  |  | Found | Theo. | Found | Theo. |
| p-Anilinophenoxy acetic acid | °C. 146–147 | | | | |
| 10-p-anilinophenoxy undecylic acid | 66–67 | | | | |
| 11-p-anilinophenoxy undecylic acid | 108–109 | 341 | 369 | 4.0 | 3.8 |
| β (p-Anilinophenoxy) propionic acid | 129–130 | 256 | 256 | | |
| p-(4-carboxybenzyloxy)-diphenylamine | 189–191 | 169 | 176 | | |
| 10-(β-naphthylaminophenoxy)-undecylic acid | 87–88 | | | | |

Commercially available acids may be used, as, for example, oleic acid. By hydrobromination followed by reaction with p-hydroxy diphenylamine in the presence of alkali a crude reaction product is obtained containing a mixture of 9- and 10-p-anilinophenoxy stearic acid as well as small amounts of neutral impurities. One such product had a neutralization equivalent, found 550, theory 467, and a nitrogen analysis, found 2.6%, theory 3.0%, and was a dark viscous oil.

The zinc salts of the above compounds are particularly useful in milled rubber, and ammonium or alkyl ammonium salts in latex.

The compounds are especially useful in rubber, in amounts varying from 0.1% to 3% by weight, based on the rubber. An additional advantage lies in the fact that these compounds do not "bleed" from the rubber and thereby cause discoloration of lacquers, fibers, etc., in contact with the rubber containing the antioxidant. Also, these chemicals are less readily extractable by organic solvents, such as those used in dry-cleaning, than are other common antioxidants.

The following examples, in which the parts are by weight, illustrate the age-resisting properties of the chemicals conveyed onto typical white stocks:

*Example 1*

| | | | |
|---|---|---|---|
| Pale crepe | 100 | 100 | 100 |
| Zinc oxide | 5 | 5 | 5 |
| Titanium dioxide | 30 | 30 | 30 |
| Sulfur | 3 | 3 | 3 |
| Tetramethyl thiuram monosulfide | 0.1 | 0.1 | 0.1 |
| p-Anilinophenoxy acetic acid | | 1.0 | |
| Zinc salt of p-anilinophenoxy acetic acid | | | 1.0 |
| Green tensile and Stretch: | T   E | T   E | T   E |
| 30 min. at 116° C | 3,900  780 | 3,500  820 | 3,400  820 |
| 45 min. at 116° C | 3,400  780 | 3,200  830 | 3,400  770 |
| 60 min. at 116° C | 3,500  830 | 3,100  810 | 3,400  800 |
| 120 hrs. oxygen bomb and stretch: | | | |
| 30 min. at 116° C | 886  670 | 1,500  800 | 1,900  800 |
| 45 min. at 116° C | ¹ P | 1,200  760 | 1,200  780 |
| 60 min. at 116° C | ¹ P | 877  680 | 1,000  680 |
| 240 hrs. oxygen bomb tensile and stretch: | | | |
| 30 min. at 116° C | ¹ P | 376  750 | 474  610 |
| 45 min. at 116° C | ¹ P | 193  420 | 224  470 |
| 60 min. at 116° C | ¹ P | 145  360 | 161  400 |

¹ P—Too poor to tensile.
T=tensile strength in lbs. per sq. inch.
E=ultimate elongation.

*Example 2*

| | | | |
|---|---|---|---|
| Pale crepe | 100 | 100 | 100 |
| Zinc oxide | 10 | 10 | 10 |
| Whiting | 60 | 60 | 60 |
| Lithopone | 60 | 60 | 60 |
| Zinc soap of cocoanut oil acids | 0.5 | 0.5 | 0.5 |
| Sulfur | 3.0 | 3.0 | 3.0 |
| Tetramethyl thiuram monosulfide | 0.15 | 0.15 | 0.15 |
| p-Anilinophenoxy acetic acid | | 1.0 | |
| 10-(p-anilinophenoxy) undecylic acid | | | 1.0 |
| Green tensile and stretch: | T   E | T   E | T   E |
| 10 min. at 122° C | 2,400  700 | 2,000  630 | 2,100  650 |
| 20 min. at 122° C | 2,400  690 | 2,300  690 | 2,300  680 |
| 30 min. at 122° C | 2,400  800 | 2,100  660 | 1,900  670 |
| 72 hrs. oxygen bomb tensile and stretch: | | | |
| 10 min. at 122° C | 1,700  610 | 1,900  620 | 2,100  600 |
| 20 min. at 122° C | 327  220 | 1,300  520 | 1,400  670 |
| 30 min. at 122° C | ¹ P | 865  530 | 1,100  630 |
| 120 hrs. oxygen bomb and stretch: | | | |
| 10 min. at 122° C | 402  370 | 1,400  590 | 1,800  620 |
| 20 min. at 122° C | ¹ P | 752  510 | 1,300  590 |
| 30 min. at 122° C | ¹ P | 368  270 | 1,200  610 |
| 240 hrs. oxygen bomb tensile and stretch: | | | |
| 10 min. at 122° C | ¹ P | 651  470 | 1,700  620 |
| 20 min. at 122° C | ¹ P | 256  390 | 1,200  580 |
| 30 min. at 122° C | ¹ P | ¹ P | 808  510 |

¹ P—Too poor to tensile.

*Example 3*

| | |
|---|---|
| Pale crepe | 100 |
| Zinc oxide | 10 |
| Lithopone | 60 |
| Whiting | 60 |
| Zinc salt of cocoanut fatty acids | 0.5 |
| Sulfur | 3.0 |
| Tetra methyl thiuram monosulfide | 0.15 |

To separate portions of the above stock, the indicated number of parts by weight of the following chemicals were added per one hundred parts of rubber on a mill at 150° F., and slabs 0.1 inch thick were cured in a mold for 20 and 30 minutes at 122° C. with the following results:

| | | |
|---|---|---|
| p-(4-carboxy-benzyloxy)-diphenylamine | 0.5 | |
| β-(p-Anilinophenoxy) propionic acid | | 0.5 |
| Green: | T   E | T   E |
| 20 min. at 122° C | 2,300  7.1 | 2,300  6.8 |
| 30 min. at 122° C | 2,100  7.1 | 2,000  7.0 |
| Aged 120 hrs. in oxygen bomb: | | |
| 20 min. at 122° C | 561  4.5 | 1,200  6.6 |
| 30 min. at 122° C | 284  3.3 | 755  5.8 |
| Aged 240 hrs. in oxygen bomb: | | |
| 20 min. at 122° C | 319  2.5 | 470  4.6 |
| 30 min. at 122° C | ¹ P | 345  3.4 |

¹ P—Too poor to tensile.
T=tensile strength in lbs. per sq. inch.
E=ultimate elongation.

The invention may be applied to the preservation of natural as well as artificially prepared rubbers, including reclaims and latices of such rubbers.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the antioxidant may vary from about 0.1% to 3% although either smaller or greater proportions may be found useful. If the material to which it is added is a liquid such as rubber cement or an oil the antioxidant may be dissolved therein in a suitable small proportion. The antioxidant may be incorporated into solid

Having thus described our invention, what we claim and desire to protect by Letters Patent is:

1. A method of preserving organic substances which tend to deteriorate by absorption of oxygen from the air, which comprises incorporating therein a compound having the general formula Ar—NH—Ar'—O—Y—COOX where Ar is an aryl group; Ar' is an arylene group; Y is a hydrocarbon radical; X is a member of the group consisting of hydrogen and base-forming radicals.

2. A method of preserving organic substances which tend to deteriorate by absorption of oxygen from the air which comprises incorporating therein an arylamino-aryloxy-aliphatic hydrocarbonoic acid in which the aliphatic hydrocarbon group is saturated.

3. A method of preserving organic substances which tend to deteriorate by absorption of oxygen from the air which comprises incorporating therein a metal salt of an arylamino-aryloxy-aliphatic hydrocarbonoic acid in which the aliphatic hydrocarbon group is saturated.

4. A method of preserving organic substances which tend to deteriorate by absorption of oxygen from the air which comprises incorporating therein an anilinophenoxy hydrocarbonoic acid.

5. A method of preserving organic substances which tend to deteriorate by absorption of oxygen from the air which comprises incorporating therein an anilinophenoxy aliphatic hydrocarbonoic acid in which the aliphatic hydrocarbon group is saturated.

6. A method of preserving organic substances which tend to deteriorate by absorption of oxygen from the air which comprises incorporating therein an anilinophenoxy aromatic hydrocarbonoic acid.

7. A method of preserving organic substances which tend to deteriorate by absorption of oxygen from the air which comprises incorporating therein a zinc salt of an anilinophenoxy hydrocarbonoic acid.

8. A method of preserving organic substances which tend to deteriorate by absorption of oxygen from the air which comprises incorporating therein a zinc salt of 10-(p-anilinophenoxy) undecylic acid.

9. A method of preserving organic substances which tend to deteriorate by absorption of oxygen from the air which comprises incorporating therein 10-(p-anilinophenoxy) undecylic acid.

10. A method of preserving rubber which comprises incorporating therein a compound having the general formula Ar—NH—Ar'—O—Y—COOX where Ar is an aryl group; Ar' is an arylene group; Y is a hydrocarbon radical; X is a member of the group consisting of hydrogen and base-forming radicals.

11. A method of preserving rubber which comprises incorporating therein 10-(p-anilinophenoxy) undecylic acid.

12. Rubber containing a compound having the general formula Ar—NH—Ar'—O—Y—COOX where Ar is an argyl group; Ar' is an arylene group; Y is a hydrocarbon radical; X is a member of the group consisting of hydrogen and base-forming radicals.

13. A method of preserving organic substances which tend to deteriorate by absorption of oxygen from the air, which comprises incorporating therein a compound having the general formula Ar—NH—Ar'—O—Y—COOX where Ar is an aryl group; Ar' is an arylene group; Y is a saturated hydrocarbon radical; X is a member of the group consisting of hydrogen and base-forming radicals.

14. A method of preserving organic substances which tend to deteriorate by absorption of oxygen from the air, which comprises incorporating therein an anilinophenoxy hydrocarbonoic acid in which the hydrocarbon group attached to carboxyl is saturated.

15. A method of preserving organic substances which tend to deteriorate by absorption of oxygen from the air which comprises incorporating therein a zinc salt of an anilinophenoxy hydrocarbonoic acid in which the hydrocarbon group of the hydrocarbonoic group is saturated.

16. A method of preserving rubber which comprises incorporating therein a compound having the general formula Ar—NH—Ar'—O—Y—COOX where Ar is an aryl group; Ar' is an arylene group; Y is a saturated hydrocarbon radical; X is a member of the group consisting of hydrogen and base-forming radicals.

17. Rubber containing a compound having the general formula Ar—NH—Ar'—O—Y—COOX where Ar is an aryl group; Ar' is an arylene group; Y is a saturated hydrocarbon radical; X is a member of the group consisting of hydrogen and base-forming radicals.

EDWIN J. HART.
ROBERT T. ARMSTRONG.